United States Patent
Bella et al.

(10) Patent No.: US 9,071,064 B2
(45) Date of Patent: Jun. 30, 2015

(54) WIRELESS ENERGY TRANSFER SYSTEM AND METHOD FOR FEEDING AN ELECTRIC LOAD

(75) Inventors: Valter Bella, Turin (IT); Felice Fulvio Faraci, Turin (IT)

(73) Assignee: Telecom Italia S.p.A., Milan (IT)

(*) Notice: Subject to any disclaimer, the term of this patent is extended or adjusted under 35 U.S.C. 154(b) by 382 days.

(21) Appl. No.: 13/519,841

(22) PCT Filed: Dec. 29, 2010

(86) PCT No.: PCT/IB2010/003361
§ 371 (c)(1),
(2), (4) Date: Jun. 28, 2012

(87) PCT Pub. No.: WO2011/080577
PCT Pub. Date: Jul. 7, 2011

(65) Prior Publication Data
US 2012/0286728 A1 Nov. 15, 2012

(30) Foreign Application Priority Data
Dec. 30, 2009 (IT) ................ TO2009A1060

(51) Int. Cl.
*H02J 7/00* (2006.01)
*H02J 3/02* (2006.01)
(Continued)

(52) U.S. Cl.
CPC .. *H02J 5/005* (2013.01); *H02J 3/02* (2013.01); *H02J 7/00* (2013.01); *B60C 23/041* (2013.01);
(Continued)

(58) Field of Classification Search
CPC .................... H02J 7/00; H02J 3/02

USPC ............. 320/108, 130, 133, 142, 145, 155; 307/27, 153
See application file for complete search history.

(56) References Cited

U.S. PATENT DOCUMENTS 7,202,778 B2    4/2007  Buenz et al.
8,461,720 B2 *  6/2013  Kurs et al. ............. 307/104
(Continued)

FOREIGN PATENT DOCUMENTS

EP          558316 A1 *  9/1993 ............. A61B 17/36
GB         2418541 A     3/2006
WO     2006/031133 A1    3/2006

OTHER PUBLICATIONS

Written Opinion and International Search Report mailed Jul. 14, 2011, PCT/IB2010/003361.
(Continued)

*Primary Examiner* — Phallaka Kik
(74) *Attorney, Agent, or Firm* — Banner & Witcoff, Ltd.

(57) ABSTRACT

A wireless energy transfer system and an associated method for feeding an electric load are provided. The system includes a transmitter which includes a generator adapted to generate a radiofrequency signal at a first frequency and a first resonant circuit adapted to transmit the radiofrequency signal; and a receiver adapted to receive the radiofrequency signal and comprising a second resonant circuit. The second resonant circuit is adapted to be located in the non-radiative near field generated by the first resonant circuit, and the transmitter includes frequency sweeping functionality, which imposes on the radiofrequency signal generator a cyclic excursion of the first frequency in the neighborhood of a nominal frequency of the generator so that, when the first frequency matches the resonant frequency of the second resonant circuit, a non-radiative energy transfer occurs.

18 Claims, 4 Drawing Sheets

(51) Int. Cl.
*H02J 5/00* (2006.01)
*B60C 23/04* (2006.01)
*H04B 5/00* (2006.01)

(52) U.S. Cl.
CPC ......... *B60C 23/0413* (2013.01); *B60C 23/0433* (2013.01); *H04B 5/0037* (2013.01); *H04B 5/0093* (2013.01)

(56) References Cited

U.S. PATENT DOCUMENTS

| | | | |
|---|---|---|---|
| 8,855,554 B2 * | 10/2014 | Cook et al. | 455/41.1 |
| 8,912,687 B2 * | 12/2014 | Kesler et al. | 307/104 |
| 2006/0197655 A1 | 9/2006 | Luo et al. | |
| 2006/0259215 A1 * | 11/2006 | Lin | 701/29 |
| 2007/0222571 A1 | 9/2007 | Saitou et al. | |
| 2007/0262856 A1 | 11/2007 | Saitou et al. | |
| 2009/0174263 A1 | 7/2009 | Baarman | |
| 2009/0210035 A1 | 8/2009 | Gelbart | |
| 2010/0233958 A1 * | 9/2010 | Washiro | 455/41.1 |
| 2010/0280568 A1 * | 11/2010 | Bulkes et al. | 607/33 |
| 2011/0084658 A1 * | 4/2011 | Yamamoto et al. | 320/108 |
| 2014/0312706 A1 * | 10/2014 | Fiorello et al. | 307/104 |
| 2014/0312802 A1 * | 10/2014 | Recker et al. | 315/291 |

OTHER PUBLICATIONS

A. Kurs et al., "Wireless Power Transfer via Strongly Coupled Magnetic Resonances", Science (317) Jul. 6, 2007 pp. 83-86.

* cited by examiner

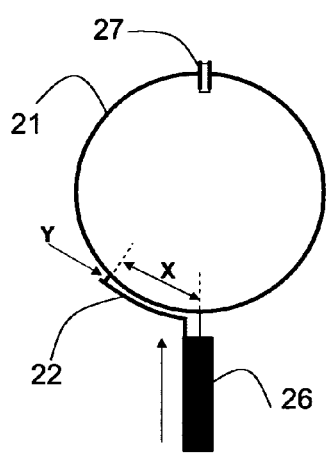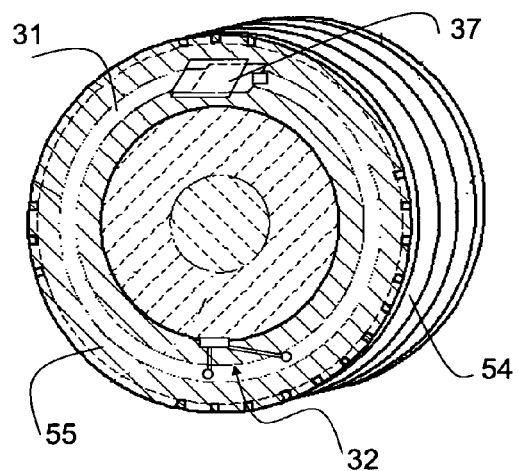
Fig. 3
Fig. 4

WIRELESS ENERGY TRANSFER SYSTEM AND METHOD FOR FEEDING AN ELECTRIC LOAD

CROSS REFERENCE TO RELATED APPLICATIONS

This application is a U.S. National Phase Application under 35 U.S.C.§371 of International Application No. PCT/IB2010/003361, filed Dec. 29, 2010, which claims priority to Italian patent application TO2009A001060, filed Dec. 30, 2009, and which was published Under PCT Article 21(2), the entire contents of which are incorporated herein by reference.

FIELD OF THE DISCLOSURE

The present invention relates to the field of systems for transferring energy in wireless mode between a transmitter and a receiver.

More in particular, the present invention relates to a system for transferring energy in wireless mode between a transmitter and a receiver located at a distance from each other, wherein obstacles, even of metallic nature, are present in the space surrounding the transmitter and the receiver and/or the transmitter cannot be conveniently connected to the receiver through a wired connection.

BACKGROUND

With the increasing availability of smaller and smaller sensors and microcontrollers, reactive-type systems have been integrated into vehicles which ensure better vehicle stability. Such systems include, for example, ABS (anti-lock braking system), EBD (electronic brake-force distribution) and so on.

Wheel tires have also recently been used to house sensors capable of improving vehicle safety. One example of a known system is TPMS (tire pressure monitoring system), which monitors the pressure in each tire and, if it decreases, alerts the driver through a warning lamp lighting up in the instrument panel.

A further quality jump is currently being made: in fact, said reactive systems are being gradually replaced by pro-active systems. The latter are capable of evaluating in advance the behavior of the vehicle according to an integrated model that includes the road, the vehicle, the tire and the environment.

As the complexity of the safety system increases, the number of sensors to be arranged in the tire increases as well and, in addition to problems of mechanical nature posed by the integration of said sensors, one must face the problem of supplying power to the radio node used for transmitting the collected data. Early systems were rather simple and used small tire-integrated batteries, the life of which was similar to that of the tire itself.

In the new safety systems that also involve the vehicle's tires, more energy is required because, in addition to supplying power to the data transmission radio node, it is also necessary to feed microcontrollers built in the sensors, which pre-process and filter the multitude of collected data. The life of the batteries currently available is not sufficient to meet the new power specifications.

More in general, low-cost energy generation for feeding a vehicle's electric component is nowadays a subject of intense research.

As to the state of the art of batteryless systems used for feeding devices integrated into a vehicle's wheels, in particular in the tires, the literature can be subdivided into three categories.

The first category includes the so-called "energy harvesting" systems. Such systems collect the mechanical stresses and vibrations of the rotating tire and transduce them into electric energy using suitable devices, typically of piezoelectric nature.

The systems belonging to this first category are relatively simple, but the quantity of energy extracted is small and often insufficient to meet the energy requirements of the most advanced tire-integrated electronic systems.

The second category of batteryless systems for feeding devices integrated into a vehicle's wheels includes magnetic induction systems. Such systems are based on the dynamo principle. In fact, these systems comprise a winding installed in the tire, and a magnet is arranged in the body, near said winding. The turning tire generates a voltage across the winding, which voltage is then stabilized and used for feeding the electronics integrated into the tire itself. Although the systems belonging to said second category can provide a good power level, they require additional components which are typically both costly and bulky, such as, for example, ultracapacitors, used for storing energy that can be used when no energy is available, as is the case, for example, when a vehicle is temporarily standing still at a traffic light.

The third category of batteryless systems for feeding devices built in a vehicle's wheels includes radiofrequency energy transfer systems. Such systems exploit the possibility of transferring radiofrequency energy from a transmitter located in the vehicle to a receiver circuit integrated into the tire, which detects the radiofrequency field and converts it into direct current, necessary to power the tire-integrated electronic circuitry.

In this context, solutions have been presented which range from radiofrequency signals of just a few MHz, such as RFID transponders, to microwave signals of many GHz, which are converted into direct current by a special device called rectenna.

This class of solutions, while ensuring that sufficient energy can be transferred to feed tire-integrated sensors, has some drawbacks, such as the possibility of radio interference with other vehicle's onboard equipment, limited transfer efficiency due to the presence of thick metallic parts of the vehicle that shield the propagation of the electromagnetic signal, and dispersion of the irradiated energy outside the spatial sector concerned by the transfer. Some patent applications belonging to said third category are, for example, U.S. patent applications Nos. 2006/0197655, 2007/0262856, 2007/0222571 and U.S. Pat. No. 7,202,778.

More in particular, U.S. Pat. No. 7,202,778 describes a wireless system for monitoring the pressure of an aircraft's tires. Each wheel of the aircraft comprises two resonant circuits which can be interrogated by two resonant circuits arranged on the aircraft, wherein one circuit emits a frequency sweeping signal and the other one receives the response resonance peak. The two wheel-mounted resonant circuits have different resonant frequencies; therefore, when the frequency sweeping means on the aircraft side start the scanning process, they encounter two distinct resonance peaks. The scan starts at a frequency of 14 MHz; the frequency then gradually increases until the two resonance peaks of the wheel-side resonant circuits are encountered. Each resonance peak is temporarily locked by a PLL (Phase Locked Loop), which acquires its frequency value and stores it into a register. A processor calculates the frequency difference between the two resonance peaks and from this information obtains the tire pressure. However, this architecture is very complex from the electronic viewpoint, in that it requires four resonant circuits per wheel to which power must be supplied, plus a number of processing units.

Evanescent waves are also known in the art, defined as waves present in the immediate vicinity of an antenna, i.e. in the non-radiative near field. The energy of evanescent waves is emitted, and almost totally reabsorbed, in a cyclic manner. These waves are said to be evanescent because the effects of their presence decrease exponentially as the distance from the antenna increases; at a distance as short as approx. one third of their length, they are no longer detected. Evanescent waves are discussed, for example, in "Wireless power transfer via strongly coupled magnetic resonances", Andrè Kurs, Robert Moffat, Peter Fisher, Aristeidis Karalis, J. D. Joannopoulos and Marin Soljačić, published in the journal "Science", Vol. 317, 6 Jul. 2007, pp. 83-86.

SUMMARY

It is one object of the present invention to provide a wireless energy transfer system and method for feeding an electric load which can maximize energy transfer efficiency.

It is another object of the present invention to provide a wireless energy transfer system and method for feeding an electric load which eliminate, or at least minimize, the possibility of radio interference with other equipment installed on board a vehicle.

It is a further object of the present invention to provide a wireless energy transfer system and method for feeding an electric load which avoid the use of costly and bulky additional components.

These and other objects of the invention are achieved through the wireless energy transfer system and method for feeding an electric load as claimed in the appended claims, which are intended as an integral part of the present description.

In short, the present invention relates to a system for transferring energy in wireless mode between a first resonant circuit, e.g. arranged on board a vehicle, and a second resonant circuit, e.g. arranged on a wheel of the vehicle, in particular integrated into the tire thereof.

The wireless energy transfer is based on an evanescent-wave non-radiative field capable of feeding an electric load from a distance, such as, for example, the electronics integrated into a vehicle's wheel, in particular into a tire.

Evanescent waves are particularly effective when applied to a vehicle, in that they have several good physical properties, among which minimal dispersion in the space surrounding the area whereto the energy must be transferred and a mode of propagation suitable for avoiding obstacles, even metallic ones.

Evanescent waves allow the use of batteries in the wheel to be avoided while at the same time providing the energy required to drive the electronics integrated in the wheels of vehicles fitted with systems for monitoring wheel and tire parameters, e.g. pressure and temperature.

In order to optimize the coupling between the first and second resonant circuits, it is necessary that both circuits have the same resonant frequency. However, when the vehicle's wheel is moving, the resonant frequency of the wheel-integrated resonant circuit varies over time, because the wheel is subject to stresses of various kinds and/or to movements due to the presence of suspensions in the wheel support devices. In these conditions, the energy transfer undergoes oscillations and may be reduced to the extent that it becomes insufficient to feed the electronics integrated into the vehicle's wheel.

According to the present invention, the resonant frequency of the resonant circuit installed on board the vehicle changes, preferably cyclically, around a frequency range centered on the nominal frequency of the resonant circuit.

With this measure, the mean energy transferred to the resonant circuit installed in the vehicle's wheel is such that it can properly feed the wheel-integrated electronics.

In a further embodiment of the invention, the resonant frequency of the resonant circuit on board the vehicle is periodically re-calculated so that the resonant frequencies of the resonant circuits can be adapted to the actual state of the wheel in operation.

The system and method according to the present invention may also be used, for example, to transfer energy in wireless mode to a rechargeable battery of an electric bicycle, wherein the transmitter, comprising a first resonant circuit, is housed in an element of a bicycle stand, and the receiver, comprising a second resonant circuit, is arranged on a part of the bicycle, e.g. on the frame or a wheel, and can supply power to the bicycle's rechargeable battery.

The system and method according to the present invention may additionally be used to transfer energy in wireless mode to any mobile or portable device, e.g. a mobile telephone, a multimedia reader or a notebook computer, in order to supply power thereto and/or recharge the batteries thereof In such cases as well, in fact, it may happen that the resonant frequency of the resonant circuit integrated into the receiver changes over time due to temperature variations or vibrations of the device, thus causing energy transfer reductions or oscillations.

Further features of the invention will be set out in the appended claims, which are intended as an integral part of the present description.

DESCRIPTION OF THE DRAWINGS

Said objects will become more apparent from the following detailed description of the wireless energy transfer system and method for feeding an electric load according to the invention, with particular reference to the annexed drawings, wherein:

FIG. 3 is a circuit diagram of a technique for connecting a resonant circuit of the transmitter or of the receiver of FIG. 2 to a low-impedance interconnection cable;

FIG. 4 is a sectional view of a vehicle's wheel showing the physical implementation of a resonant circuit therein;

DETAILED DESCRIPTION

Figure 1:
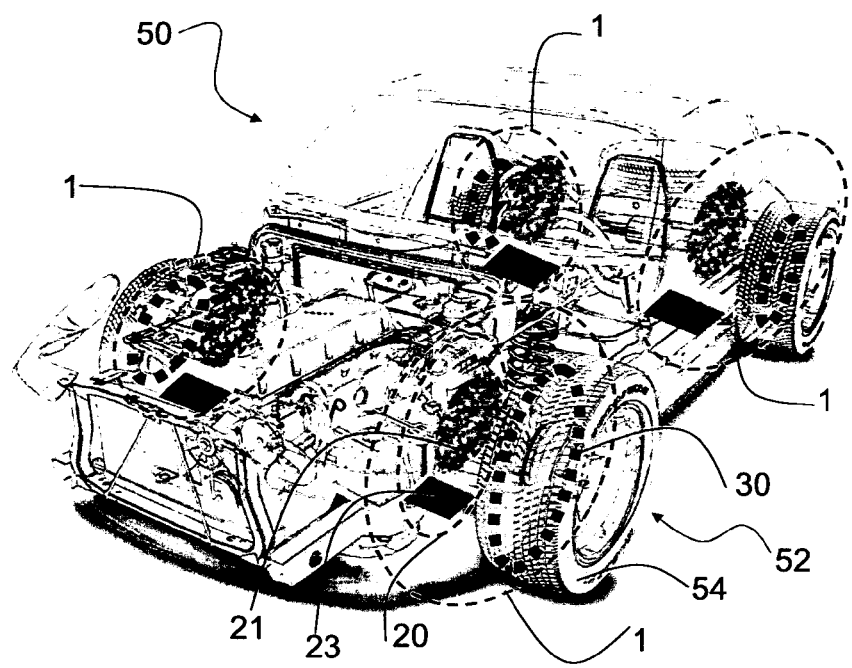
FIG. 1 is a perspective diagram of a vehicle comprising a system according to the present invention.

Referring now to FIG. 1, there is shown a perspective diagram of a vehicle 50 comprising four wheels 52 with respective tires 54 mounted thereto.

A wireless energy transfer system 1 according to the invention is installed at each wheel 52 of the vehicle 50.

The system 1 comprises a transmitter 20 adapted to transmit a radiofrequency signal and a receiver 30 adapted to receive the radiofrequency signal transmitted by the transmitter 20.

The transmitter 20 may, for example, be arranged on the chassis of the vehicle 50 in the proximity of a wheel 52, whereas the receiver 30 may, for example, be arranged on the vehicle's wheel 52. In a preferred embodiment of the invention, the receiver 30 is integrated into the rubber compound of the tire 54 associated with the wheel 52.

The receiver 30 is arranged in a manner such that it is located in the non-radiative near field generated by the radiofrequency signal, preferably at a distance not exceeding one third of the wavelength of said signal. Thus the receiver 30 can receive the evanescent waves transmitted by the receiver 20.

Figure 2:
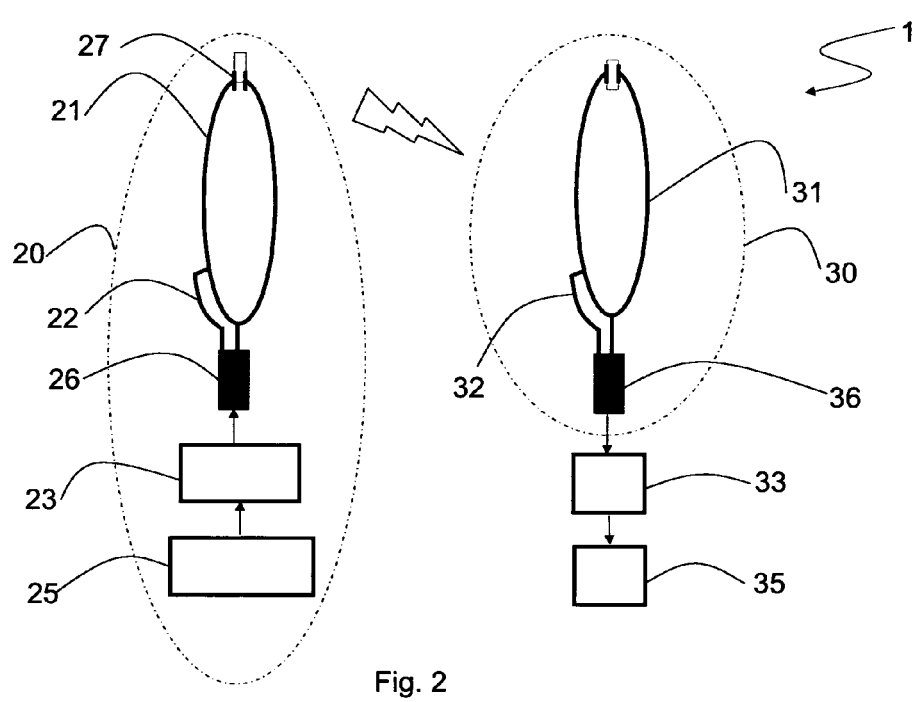
FIG. 2 is a circuit diagram of a transmitter which transmits a radiofrequency signal and a receiver that receives said signal belonging to the system of FIG. 1.

Referring now to FIG. 2, there is shown in detail the system 1 of the present invention.

The transmitter 20 comprises a radiofrequency signal generator 23, in particular a voltage-controlled oscillator, which, through a first resonant circuit 21 with a high Q factor, generates a radiofrequency signal preferably comprised between 1 MHz and 30 MHz.

In a preferred embodiment of the invention, the first resonant circuit 21 is a loop resonator geometrically and electrically designed to optimize the evanescent waves towards a respective second resonant circuit 31, e.g. integrated into the wheel 52, in particular into the tire 54, of the vehicle 50.

The transmitter 20 also comprises frequency sweeping means 25, the function of which will be explained below.

Both the transmitter 20 and the receiver 30 comprise, respectively, a first and a second impedance matching circuits 22, 32, in particular of the "gamma match" type, which supply a voltage at a low output impedance and avoid any reflections of the carrier signal which might cause inefficiency and undesired power dispersion.

Downstream of the second impedance matching circuit 32 of the receiver 30, there is a diode rectifier and filtering circuit 33 which converts the energy of the collected evanescent field into direct current necessary for feeding an electric load 35, which is representative, for example, of the electronics (sensors, microcontrollers, radio node and the like) integrated into the wheel 52, in particular into the tire 54.

Referring now to FIG. 3, there is shown a technique for connecting a first resonant circuit 21, which operates at very high impedance in the resonance point, to a first interconnection cable 26 with low impedance, typically 50Ω. The length X of the wire acting as an impedance matching circuit 22 is typically one tenth of the circumference of the first loop-type resonant circuit 21, whereas the distance Y between the interconnection cable 26 and the loop is typically 1/200th of the wavelength λ of the radiofrequency signal in use.

Similar considerations apply to the second resonant circuit 31 and the respective second low-impedance interconnection cable 36 of the receiver 30, shown in FIG. 2.

Referring now to FIG. 4, there is shown a physical implementation of the second resonant circuit 31 integrated into the wheel 52 of the vehicle 50, in particular into the tire 54.

In a preferred embodiment of the invention, the second resonant circuit 31 is provided through an open loop consisting of a strip of conductive material, e.g. copper, which is integrated into the rubber compound of the inner portion 55 of the tire 54 and has its ends misaligned and overlapped at a suitable distance in order to create a capacitance 37. The value of the capacitance thus obtained, together with the inductive value of the open loop, determines the value of the resonant frequency of the second resonant circuit 31.

When the resonant frequency of the second resonant circuit 31 matches that of the respective first resonant circuit 21, the maximum energy transfer of the evanescent field occurs. However, the second resonant circuit 21 may have a resonant frequency different from the nominal one, either because of production tolerances or due to inevitable geometrical deformations determined in real time by the stresses undergone by the wheel 52, which reverberate on the tire 54.

Herein, the term "production tolerances" refers, for example, to the geometry of the copper strip, the tolerance in the position of the strip in the tire 54, and the tolerance in its final overlapped position that creates the capacitance 37. In addition, since the capacitance dielectric is de facto the rubber compound of the tire 54, the capacitance 37 may have different values as a function of changes in its chemical, and hence dielectric, properties.

According to the invention, the frequency sweeping means 25 impose on the respective radiofrequency signal generator 23 a fast and cyclic frequency excursion in the neighborhood of its nominal value, so as to be frequently centered on the resonance value taken at a certain instant by the second resonant circuit 31, e.g. integrated into the tire 54. This mode of operation is sized appropriately in terms of bandwidth and evanescent field intensity, in a manner such that the coupling between the first resonant circuit 21 and the second resonant circuit 31 allows a mean energy transfer value to be obtained which is amply sufficient to feed the electric load 5, e.g. the electronics integrated into the wheel 52, in particular into the tire 54.

A method of operation of the system 1 will now be described with reference to FIGS. 5 and 6.

Figure 5:
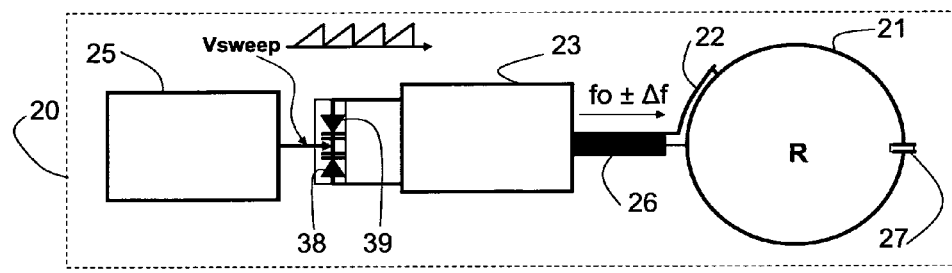
FIG. 5 is a detailed diagram of the transmitter of FIG. 2.
Figure 6:
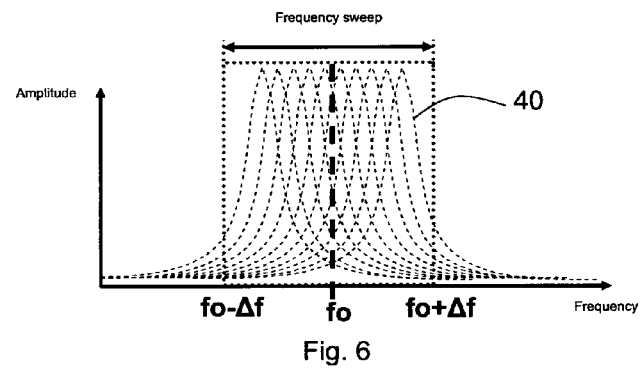
FIG. 6 is a graph that illustrates a frequency response curve of a resonant circuit integrated into a wheel of the vehicle of FIG. 1.

Referring to FIG. 5, when the electric system of the vehicle 50 is switched on, the radiofrequency signal generator 23 begins to oscillate at its nominal frequency fo. At the same time, the respective frequency sweeping means 25 impose on the radiofrequency signal generator 23 a cyclic frequency scan in the range comprised between fo−Δf and fo+Δf.

The radiofrequency signal generator 23 oscillates at the nominal frequency fo determined by the inductance value of the first resonator circuit 21 and by the equivalent capacitance introduced by a first varicap diode 38 and a second varicap diode 39, said varicap diodes 38, 39 being interposed between the frequency sweeping means 25 and the radiofrequency generator 23.

The varicap diode is a particular type of semiconductor diode whose main feature is the ability to vary its junction capacity as the inverse polarization voltage changes. It acts as a variable capacitor; therefore, when a variable signal Vsweep is applied across the first and second varicap diodes 38,39, a variation in the resonant frequency Δf is obtained in the neighborhood of the nominal frequency fo. The value Δf is chosen in a manner such as to fully cover the range of possible variations in the resonant frequency value of the second resonant circuit 31 due to the above-mentioned reasons, e.g. caused by the continual stresses undergone by the wheel 52, as shown by the curves 40 in the graph of FIG. 6.

The frequency and amplitude of the signal Vsweep respectively determine the number of cycles per second in which the scan is executed and the width thereof. The properties of the signal Vsweep are therefore selected to statistically optimize the overlapping of the resonant frequency values between the second resonant circuit 31, e.g. integrated into the wheel 52, in particular into the tire 54, and the first resonant circuit 21, e.g. arranged on board the vehicle, so as to obtain a mean energy transfer value suitable for feeding the electric load 35, e.g. representative of the electronics integrated into the wheel 52, in particular into the tire 54.

In a preferred embodiment of the invention, the signal Vsweep has a saw-tooth shape.

Rather than fixed, the nominal frequency $f_0$ of the radiofrequency signal generator 23 may be set dynamically, e.g. depending on the actual conditions of the wheel 52.

This can be attained by performing a frequency scan within a frequency range in the neighborhood of the nominal frequency, from a minimum frequency to a maximum frequency. In fact, by measuring the current absorbed by the transmitter 20 during the frequency scan, it is possible to identify a second nominal frequency $f_{0new}$ for which the maximum current absorption occurs. Since the condition of maximum current absorption coincides with the condition of maximum resonance between the first resonant circuit 21 and the second resonant circuit 31, it is possible to use the new nominal frequency $f_{0new}$ as a substitute for the nominal frequency $f_0$ of the radiofrequency signal generator 23.

By using the new nominal frequency $f_{0new}$ it is possible to reduce the sweeping interval $\Delta f$, since said new nominal frequency $f_{0new}$ is, for example, updated to the actual and instantaneous conditions of the wheel 52.

The identification of the new nominal frequency $f_{0new}$ may occur at periodic time intervals, so as to obtain a coupling between the first resonant circuit 21 and the second resonant circuit 31, and hence an energy transfer, which is as efficient and optimized as possible.

Referring back to FIG. 1, it can be seen that, for example, depending on the geometric features of the body of the vehicle 50, the second resonant circuits 31 integrated into the wheels 52, in particular into the tires 54, are housed appropriately, i.e. within the near field generated by the respective first resonant circuits 21, adapted to transmit the evanescent energetic field.

Beside the first resonant circuits 21 there are the respective radiofrequency signal generators 23, which are supplied with the voltage available in the vehicle 50 and typically distributed to every part thereof.

In the manner previously described, the system of the present invention transfers electric energy, for example, to the wheel 52 of the vehicle 50, in particular into the tires 54, thereby feeding the electric loads 35 contained therein, such as, for example, sensors, processors and radio nodes. The radio nodes can send to the central processing unit of the vehicle 50 all the information necessary for creating a safe drive system, whether reactive or proactive depending on the application context.

The following will now describe one example of embodiment of the system of FIG. 1, wherein the cited numerals are provided merely by way of example and are by no means to be considered as limiting the extent of application of the system according to the present invention.

For example, the radiofrequency signal generator 23 may output a 25 MHz carrier signal. The carrier signal can be frequency-modulated with a maximum deviation of ±250 KHz, and said modulation is functionally equivalent to the frequency sweep obtained through the frequency sweeping means 25.

By way of example, the first resonant circuit 21 may be provided in the form of a loop consisting of a 20 mm-wide strip of conductive material, e.g. copper, bent into a circular shape with a diameter of 40-50 cm, e.g., depending on the size of the tire 54.

Thanks to the skin effect, it is possible to create a flat loop like the one shown in FIG. 4. In fact, at the frequencies generated by the radiofrequency signal generator 23, the signal arranges itself exclusively on the surface of said generator because of said effect. The skin effect, which in some cases is disadvantageous, becomes advantageous in the context of the present invention because the conductor of the second resonant circuit 31, having preferably the same diameter as the loop of the first resonant circuit 21, cannot obviously have, due to lack of available room inside the wheel 52, in particular inside the tire 52, a 20 mm hollow cross-section. However, this can be remedied by constructing the loop of the second resonant circuit 31 by using a suitably wide strip: due to the skin effect, the conductor surface has thus priority over the conductor volume. The large circumference and the wide area of the loops' conductor derive from the necessity of conferring thereon a high Q factor, in that the efficiency of the energy transfer therebetween is proportional to the product of the respective "Q factors". In substance, in order to obtain an efficient energy transfer it is necessary that: Qemitter×Qreceiver≈$10^6$.

The Q factor indicates the quality to be achieved in a tuned circuit, and is expressed as an dimensionless number by the formula Q=fo/$\Delta$f, where fo is the resonant frequency of the tuned circuit and $\Delta$f is the bandwidth, i.e. the difference between the minimum frequency and the maximum frequency which are attenuated by 3 dB relative to the resonant frequency fo.

With the above-mentioned technical specifications, the first resonant circuit 21 will have an inductance of 0.65 µH and a Q factor of 1,021. Hence the passband $\Delta$f of the inductance of the first resonant circuit 21 will be $\Delta$f=fo/Q=25 MHz/1,021=24.5 KHz.

The resonance fo at the 25 MHz carrier signal is obtained with a transmission-side capacitance 27 of 60.7 pF due to the following relation: $f_0 = 1/(2 \cdot \pi \cdot (LC)^{1/2})$.

The second resonant circuit 31 is caused to resonate at exactly the same frequency as the first resonant circuit 21 by way of the reception-side capacitance 37. The energy collected at high impedance by the second resonant circuit 31 is then made available at low impedance through the second impedance matching circuit 32, so that it can be used for feeding the electric load 35 integrated into the wheel 52, in particular into the tire 54.

Because of the high Q factor of both loops (≈1,000), a strong magnetic resonance is created which ensures an energy transfer being about a million times more intense than that caused by the free propagation of the magnetic component of the near field, which, as known in the literature, decreases with the cube of the distance.

In the case of a rotating tire, the temporary and random geometrical deformations of the order of one centimeter occurring on the second resonant circuit 31 determine a reduced offset of the resonance point, in that the inductive value of the second resonant circuit 31 is more related to the value of the circumference than to the deformation thereof The same applies to the value of the reception-side capacitance 37, which is more related to the area and distance of the capacitance armatures than to the temporary deformation thereof What must be compensated for to a larger extent are the overall variations in the reception-side inductance and in the reception-side capacitance 37, related to pressure and temperature variations occurring in the tire 54 which alter the circumference of the receiver-side inductance and the geometries of the receiver-side capacitance 37 through their stretching and expansion effects.

Evaluations of said unwanted effects have led to estimate the variation occurring in the resonant frequency to be equal to ±1%, which in the above-mentioned case corresponds to a maximum offset of ±250 KHz.

The features of the present invention, as well as the advantages thereof, are apparent from the above description.

A first advantage of the present invention is that production tolerances and inevitable deformations caused by the stresses undergone by the resonant circuits, e.g. integrated into the wheels, in particular into the tires, are compensated for in real time by the electronic system according to the present invention.

A second advantage of the present invention is that the energy required by the electric load, e.g. integrated into the wheel, is immediately available, and the system needs no costly and bulky devices for storing said energy, unlike other systems used for moving the vehicle.

Another advantage of the present invention is that the probability of radio interference with other vehicle's onboard equipment is extremely low, in that the evanescent energetic field that feeds the electric load, e.g. integrated into the wheel, is of the non-radiative type.

A further advantage of the present invention is its higher ability to propagate the transmitted energy even in the presence of thick metallic parts of the vehicle between the first resonant circuit, e.g. on board the vehicle, and the second resonant circuit, e.g. integrated into the wheel, in particular into the tire. In fact, an advantageous feature of evanescent waves is that, due to their mode of propagation, they can easily avoid obstacles, even metallic ones.

A further advantage of the present invention is that there is limited dispersion of the irradiated energy outside the spatial sector involved in the energy transfer.

Yet another advantage of the present invention is that the quantity of energy made available by the system according to the present invention is scalable and can therefore be optimized in relation to the electric load, so as to be adequate and optimized for the requirements of the latest electronics, e.g. integrated into the wheel, in particular into the tire.

The system and method described herein by way of example may be subject to many possible variations without departing from the novelty spirit of the inventive idea; it is also clear that in the practical implementation of the invention the illustrated details may have different shapes or be replaced with other technically equivalent elements.

For example, the invention has been described so far with reference to a vehicle fitted with an electric system, but it is also applicable to other vehicles, e.g. a bicycle.

In fact, the system and method according to the present invention may, for example, be used for recharging a battery of an electric bicycle.

A first resonant circuit may be housed on an element of a bicycle stand, which, being typically circular in shape, is well suited to housing a resonant circuit, in particular provided in loop form.

A second resonant circuit may be housed on the bicycle's wheel or frame, arranged in a manner such that energy can be transferred in wireless non-radiative mode between the first and second resonant circuits according to the invention.

The electric energy required for the operation of the transmitter may be supplied by an ad hoc power system.

It can therefore be easily understood that the present invention is not limited to a wireless energy transfer system and method for feeding an electric load, but may be subject to many modifications, improvements or replacements of equivalent parts and elements without departing from the novelty spirit of the inventive idea, as clearly specified in the following claims.

The invention claimed is:

1. A wireless energy transfer system comprising:
    a transmitter comprising a frequency sweeper, a radiofrequency signal generator adapted to generate a radiofrequency signal, and a first resonant circuit adapted to transmit a generated radiofrequency signal; and
    a receiver adapted to receive the generated radiofrequency signal and comprising a second resonant circuit having a resonant frequency,
    wherein the second resonant circuit is adapted to be located in a non-radiative near field generated by the first resonant circuit,
    wherein, based on a signal outputted by the frequency sweeper, the radiofrequency signal generator—is configured to generate a plurality of cycles of radiofrequency signals, wherein each radiofrequency signal in a cycle comprises a different frequency in a range of possible signal frequencies centered on a nominal frequency, wherein each cycle comprises at least one radiofrequency signal comprising a signal frequency that matches the resonant frequency and each cycle comprises at least one radiofrequency signal comprising a signal frequency that does not match the resonant frequency, and
    wherein each radiofrequency signal in each cycle of radiofrequency signals is transmitted by the first resonant circuit having a first impedance.

2. A system according to claim 1, wherein the resonant frequency is time-varying.

3. A system according to claim 1, wherein the nominal frequency is periodically updated.

4. A system according to claim 1, wherein the signal outputted by the frequency sweeper drives a first varicap diode and a second varicap diode.

5. A system according to claim 1, wherein the transmitter further comprises, arranged between the first resonant circuit and the radiofrequency generator, an impedance matching circuit and a low-impedance interconnection cable.

6. A system according to claim 1, wherein the receiver further comprises, arranged between the second resonant circuit and a load, an impedance matching circuit, a low-impedance interconnection cable, and a diode rectifier and filtering circuit which converts received energy into direct current.

7. A system according to claim 1, wherein the first and second resonant circuits are loop resonators with a high Q factor.

8. A system according to claim 7, wherein at least one of the first resonant circuit and the second resonant circuit comprises a loop made of a conductive material strip.

9. A system according to claim 8, wherein the second resonant circuit comprises a capacitance, wherein a first end and a second end of the conductive material strip are misaligned and overlapped at a distance to create the capacitance.

10. A system according to claim 1, wherein the nominal frequency comprises a frequency between 1 MHz and 30 MHz.

11. A system according to claim 1, wherein the range corresponds to ±1% of the nominal frequency.

12. A system according to claim 1, wherein the transmitter is adapted to:
    scan a frequency range from a minimum frequency lower than the nominal frequency to a maximum frequency higher than the nominal frequency;
    measure a current absorbed by the first resonant circuit for each scanned frequency in the frequency range;
    determine a new frequency according to which a maximum current absorption by the first resonant circuit occurs; and
    generate at least one radiofrequency signal comprising a frequency within a new range of possible radiofrequency signals, the new range centered on the new frequency.

13. A system according to claim 1, wherein said first resonant circuit is arranged on board a vehicle and the second resonant circuit is integrated into a tire of the vehicle.

14. A system according to claim 1, wherein the first resonant circuit is housed in an element of a bicycle stand, and the second resonant circuit is housed on board a bicycle, and wherein the second resonant circuit is configured to feed a rechargeable battery of the bicycle.

15. A vehicle comprising a system according to claim 1.

16. A method of wireless energy transfer, comprising the steps of:
transmitting a plurality of cycles of generated radiofrequency signals by a first resonant circuit, each generated radiofrequency signal comprising a frequency in a range of possible signal frequencies centered on a nominal frequency, wherein each cycle of radiofrequency signals comprises a plurality of radiofrequency signals, wherein each radiofrequency signal in the plurality of radiofrequency signals comprises a different frequency in a range of possible signal frequencies, wherein the range of possible signal frequencies comprises at least one signal frequency that matches a resonant frequency of a second resonant circuit and at least one signal frequency that does not match the resonant frequency of the second resonant circuit, and wherein each radiofrequency signal in each cycle of radiofrequency signals is transmitted by the first resonant circuit having a first impedance; and
receiving said plurality of radiofrequency signals by the second resonant circuit, wherein the second resonant circuit is located in a non-radiative near field generated by the first resonant circuit.

17. A method according to claim 16, comprising further steps of:
scanning a frequency range from a minimum frequency lower than the nominal frequency to a maximum frequency higher than the nominal frequency;
measuring a current absorbed by the first resonant circuit for each scanned frequency in the frequency range;
determining a new frequency according to which a maximum current absorption by the first resonant circuit occurs; and
generating at least one radiofrequency signal using the new frequency, wherein the generated at least one radiofrequency signal comprises a frequency within a new range of possible radiofrequency signals centered on the new frequency.

18. A method according to claim 17, wherein the further steps are executed at periodic time intervals.

\* \* \* \* \*